(12) United States Patent
Suthar

(10) Patent No.: US 10,002,320 B1
(45) Date of Patent: Jun. 19, 2018

(54) TRANSACTION CARD HAVING STRUCTURAL REINFORCEMENT

(71) Applicant: Capital One Services, LLC, McLean, VA (US)

(72) Inventor: Om J. Suthar, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/699,479

(22) Filed: Sep. 8, 2017

Related U.S. Application Data

(63) Continuation of application No. 15/698,109, filed on Sep. 7, 2017.

(60) Provisional application No. 62/432,117, filed on Dec. 9, 2016.

(51) Int. Cl.
*G06K 19/077* (2006.01)

(52) U.S. Cl.
CPC . *G06K 19/07722* (2013.01); *G06K 19/07728* (2013.01); *G06K 19/07745* (2013.01)

(58) Field of Classification Search
None
See application file for complete search history.

(56) References Cited

U.S. PATENT DOCUMENTS

| 5,497,297 A | * | 3/1996 | Kilmer | G06K 19/077 235/492 |
| 5,991,159 A | * | 11/1999 | Kraiczyk | H05K 5/026 235/492 |

* cited by examiner

*Primary Examiner* — Kristy A Haupt
(74) *Attorney, Agent, or Firm* — Finnegan, Henderson, Farabow, Garrett & Dunner LLP

(57) ABSTRACT

A transaction card may include a first card component having a first interior surface, a first exterior surface, and a first structural feature. The transaction card may also include a second card component separate from the first card component, and including a second interior surface, a second exterior surface, and a second structural feature. The first and second structural features may be configured to interconnect. One of the first and second card components may include a locating feature configured to accommodate the transaction component, and the other of the first and second card components may be configured to provide access to a transaction component. The first structural feature may include a plurality of ribs separated by gaps, and the second structural feature may include a plurality of recesses separated by gaps. The first and second structural features may form a snap fit, an interference fit, or a sliding fit connection.

19 Claims, 11 Drawing Sheets

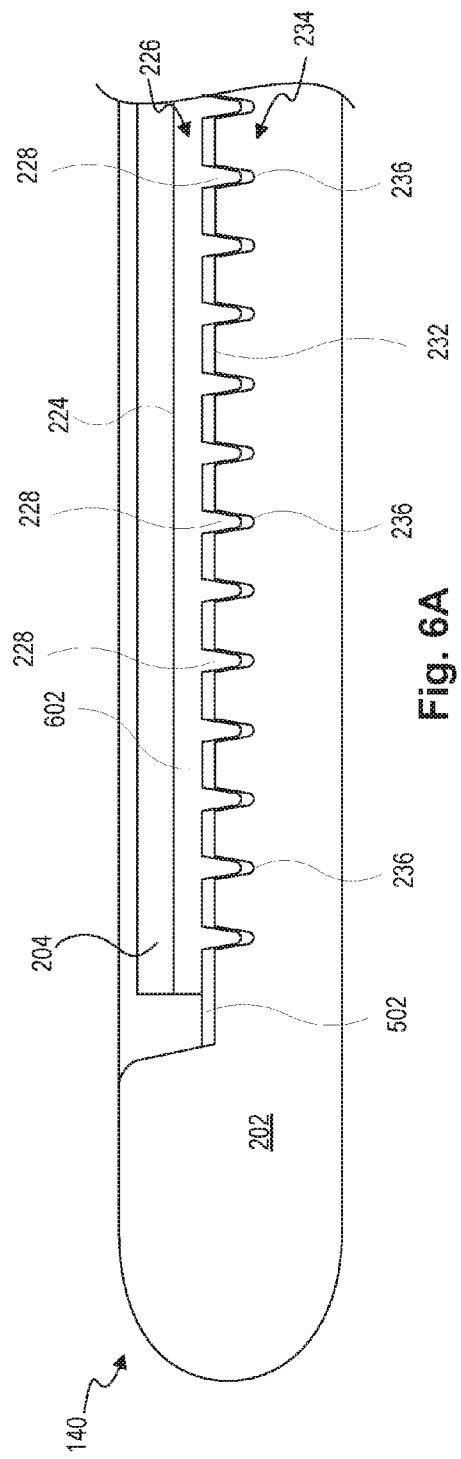
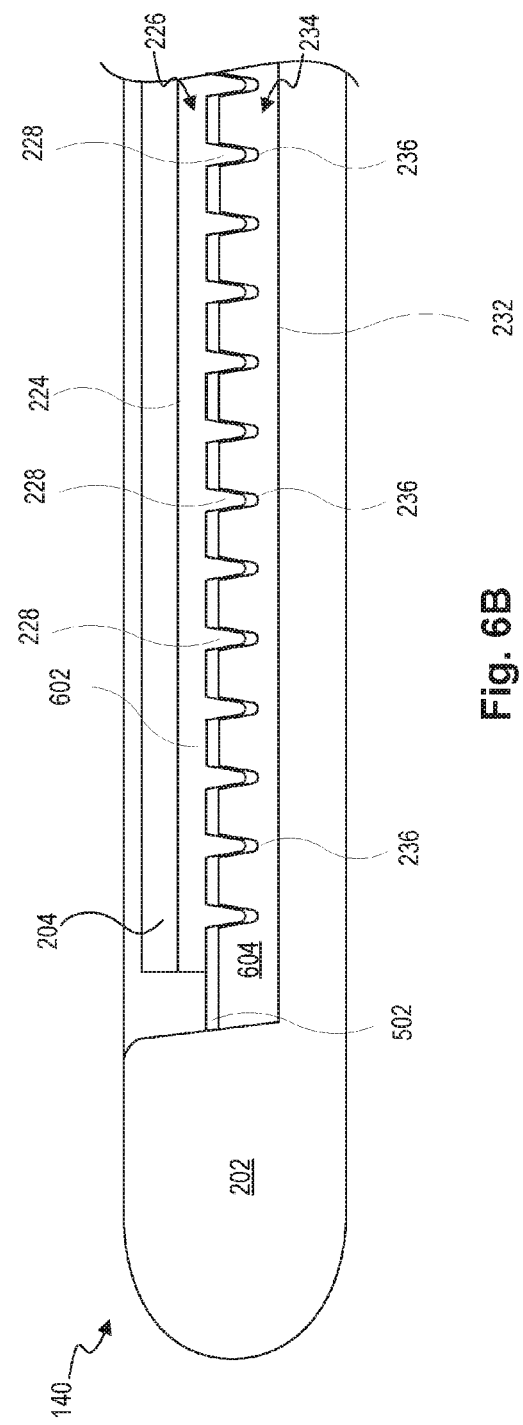

TRANSACTION CARD HAVING STRUCTURAL REINFORCEMENT

RELATED APPLICATIONS

This application is a continuation of application Ser. No. 15/698,109, filed Sep. 7, 2017, which claims priority to U.S. Provisional Patent Application No. 62/432,117, filed Dec. 9, 2016. The contents of both applications are hereby incorporated by reference in their entireties.

DESCRIPTION

Technical Field

The disclosed embodiments generally relate to a transaction card, and particularly, to a transaction card having structural improvements.

Background

Transaction cards, such as credit and debit cards, have increasingly become a primary means for customers to complete financial transactions. Typically, transaction cards are formed out of a plastic material as a single piece. For example, a typical credit card may be manufactured out of plastic such as polycarbonate (PC) or polyvinyl chloride (PVC) using an injection molding process. The plastic card may then be modified to add functional and/or visual features. For example, a magnetic strip or electronic device (e.g., a microchip) may be affixed to one side, the card may be stamped with the card number and customer name, and color or a design may be added for appearance.

Transaction cards having a one-piece construction may have several drawbacks that can lead to reduced performance and/or require the transaction card to be periodically replaced. For example, tensile and compressive forces generated when a conventional one-piece card is flexed can cause the magnetic strip (typically affixed to a rear surface by a laminate cover) and/or the microchip (typically affixed to a front surface by an adhesive) to separate from the card or become damaged. That is, when a conventional one-piece transaction card is flexed, the adhesive securing the microchip to the front surface of the card can fail, resulting in the ejection of the microchip from the card surface. Flexure of the card can also cause the laminate securing the magnetic strip to "bubble" or detach from the rear surface of the card. Minor flexures may in fact occur each time the card is placed into a wallet or payment card slot of a transaction machine (e.g., an ATM), all but ensuring that the card will eventually become unusable.

Conventional transaction cards may also suffer from additional drawbacks. For example, typical materials used to manufacture the cards (e.g., PC and PVC plastic) result in transaction cards that are not very not very strong and are prone to breaking or cracking. Limitations on card thickness, as well as cost considerations, prohibit the use of thicker transaction cards, thereby requiring manufacturers to pursue other ways of improving the structural integrity of transaction cards.

The present disclosure is directed to overcoming one or more of the problems set forth above and/or other problems associated with conventional transaction card constructions.

SUMMARY

The disclosed embodiments relate to a credit card having a two-piece construction providing improved structural properties.

In one aspect, the present disclosure is directed to a transaction card. The transaction card may include a first card component having a first surface and a first structural feature associated with the first surface. The transaction card may also include a second card component separate from the first card component and attachable thereto. The second card component may include a second surface and a second structural feature associated with the second surface. The first and second structural features may be configured to interconnect to interconnect.

In another aspect, the present disclosure is directed to a method of manufacturing a transaction card. The method may include forming a first card component having a first surface and forming a first structural feature associated with the first surface. The method may further include forming a second card component separate from the first card component and attachable thereto and having a second surface. The method may further include forming a second structural feature associated with the second surface, wherein the first and second structural features are configured to interconnect.

In another aspect, the present disclosure is directed to a transaction card, comprising a first card component, including a first interior surface, a first exterior surface opposite the first interior surface, and a first structural feature associated with the first interior surface. The card may include a second card component separate from the first card component and attachable thereto, wherein the second card component includes a second interior surface, a second exterior surface opposite the second interior surface, and a second structural feature associated with the second interior surface. The card may further include a transaction component. One of the first and second card components may include a locating feature configured to accommodate the transaction component, and the other of the first and second card components may be configured to provide access to the transaction component. The first and second structural features may be configured to interconnect.

In another aspect, the first structural feature may comprise a plurality of ribs separated by gaps.

In another aspect, the ribs may be integral with the first card component.

In another aspect, the ribs may be attached to the first card component by adhesion, material deposition, or fasteners.

In another aspect, the ribs may have a draft angle greater than zero degrees.

In another aspect, the draft angle may be between 0.5 degrees and 3.5 degrees.

In another aspect, a width of the gaps may be 1-5 times a width of the ribs.

In another aspect, the second structural feature may comprise a plurality of recesses separated by gaps.

In another aspect, the recesses may have a draft angle greater than zero.

In another aspect, the draft angle may be between 0.5 degrees and 3.5 degrees.

In another aspect, the first and second structural features may be configured to form a snap fit, an interference fit, or a sliding fit connection.

In another aspect, the first and second structural features may be configured to interconnect via a tongue and groove connection.

In another aspect, the first and second structural features may be configured to interconnect via a lattice pattern.

In another aspect, the card may further comprise a first bracing layer between the first and second card components, wherein the first bracing layer is affixed to one of the first and second interior surfaces, one of the first and second structural features is disposed on the first bracing layer, and the first bracing layer includes a locating feature configured to further accommodate the transaction component.

In another aspect, the card may further comprise a second bracing layer between the first and second card components, wherein the second bracing layer is affixed to other of the first and second interior surfaces that is not affixed to the first bracing layer, the other of the first and second structural features not disposed on the first bracing layer is disposed on the second bracing layer, the second bracing layer includes a locating feature configured to further accommodate the transaction component.

In another aspect, the card may further comprise a single bracing layer having a first side opposite a second side, wherein each of the first and second sides of the bracing layer comprises one of the first and second structural features, and wherein each of the first and second interior surfaces are configured to interconnect with the bracing layer.

In another aspect, the first and second sides of the bracing layer may include the same type of structural feature.

In another aspect, the first and second interior surfaces may include a structural feature configured to interconnect with the first and second structural features of the bracing layer.

In another aspect, the first and second sides of the bracing layer may include different types of structural features.

In another aspect, the first interior surface may include a structural feature configured to interconnect with one of the first and second structural features of the bracing layer, and the second interior surface may include a structural feature configured to interconnect with the other of the first and second structural features of the bracing layer.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 6A is another cross-sectional illustration taken along line 5-5 of FIG. 2A, consistent with disclosed embodiments;

FIG. 6B is another cross-sectional illustration taken along line 5-5 of FIG. 2A, consistent with disclosed embodiments;

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include a two-piece transaction card having structural improvements. For example, disclosed embodiments include a two-piece transaction card having a first card component, a second card component, and structural features disposed between the first and second card components. In some embodiments, the structural features may be built into the first and second card components. In other embodiments, structural features may also or alternatively be disposed on one or more bracing layers between the first and second card components. Various methods may be used to manufacture the separate card components, the structural features, and/or the bracing layers out of different types of materials that are suitable for satisfying certain criteria or preferences. In addition, the construction of the separate components may allow for ease of assembly, as well as customization and interchangeability.

The term "transaction card," as used herein, may refer to any physical card product that is configured to provide information, such as financial information (e.g., card numbers, account numbers, etc.), quasi-financial information (e.g., rewards balance, discount information, etc.) and/or individual-identifying information (e.g., name, address, etc.), to another device. Examples of transaction cards include credit cards, debit cards, gift cards, rewards cards, frequent flyer cards, merchant-specific cards, discount cards, identification cards, and driver's licenses, but are not limited thereto.

Figure 1:
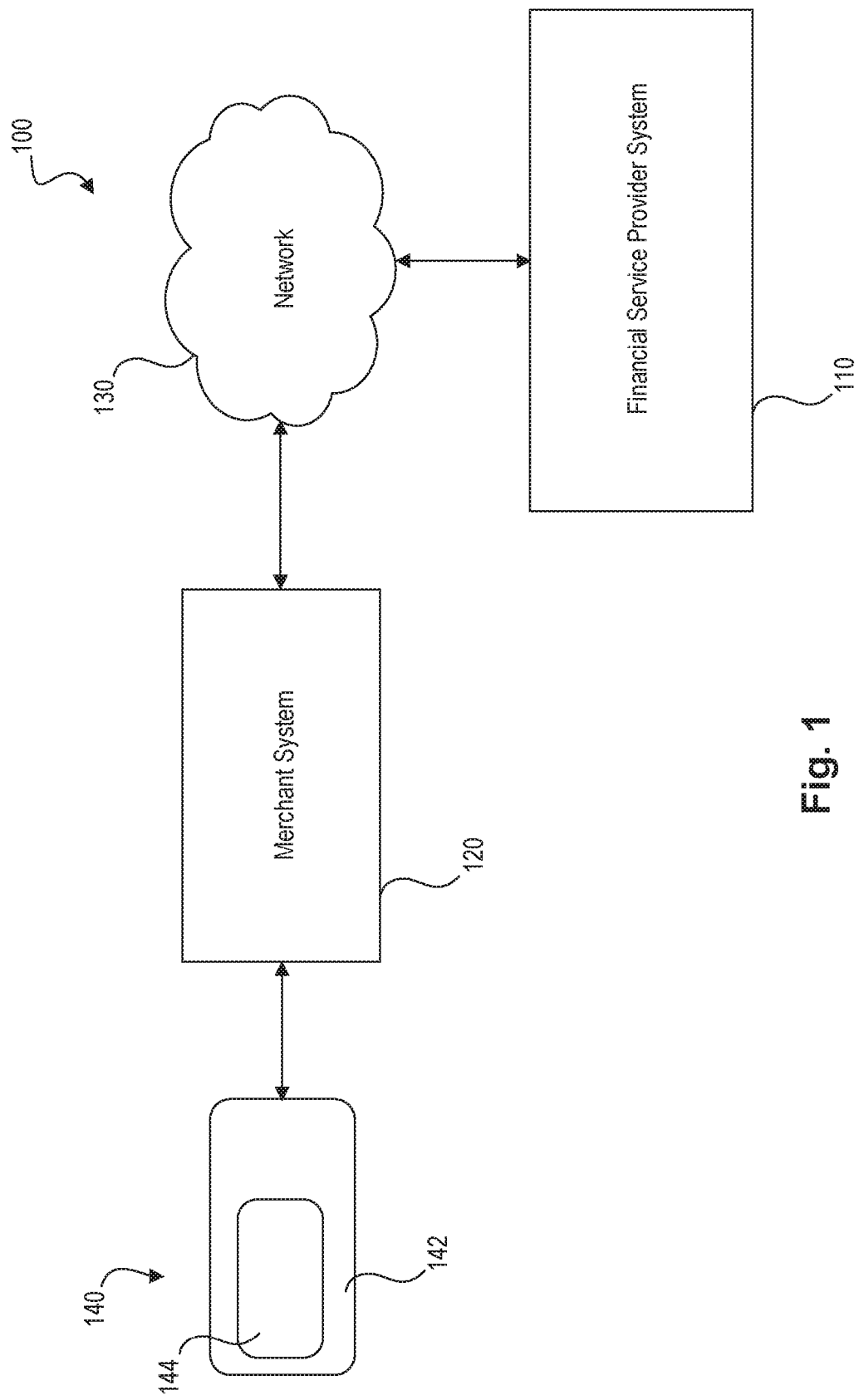
FIG. 1 is a block diagram of an example of a transaction system, consistent with disclosed embodiments.

FIG. 1 illustrates an exemplary transaction system 100. Transaction system 100 may be a computing system configured to receive and send information between the components of transaction system 100 and with components outside of system 100. In some embodiments, transaction system 100 may include a financial service provider system 110 and a merchant system 120 connected by a network 130. It should be understood, however, that transaction system 100 may include additional and/or alternative components.

Financial service provider system 110 may be one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account known to those skilled in the art. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online. In some embodiments, financial service provider system 110 may be associated with an organization other than a financial institution, including a gift or reward card administrator, an airline or frequent flyer administrator, a merchant (which may in some embodiments be associated with merchant system 120), a government institution (e.g., an agency), or the like.

Merchant system 120 may be one or more computer systems associated with a merchant. For example, merchant system 120 may be associated with an entity that provides goods and/or services (e.g., a retail store). The merchant may include brick-and-mortar location(s) that a customer may physically visit and purchase goods and services. Such physical locations may include computing devices (e.g., merchant system 120) that perform financial service transactions with customers (e.g., POS terminal(s), kiosks, etc.). Additionally or alternatively, merchant system 120 may be associated with a merchant who provides electronic shopping mechanisms, such as a website or a similar online location that consumers may access using a computer through browser software, a mobile application, or similar software. Merchant system 120 may include a client device, such as a laptop computer, desktop computer, smart phone, or tablet, that a customer may operate to accesses the electronic shopping mechanism.

Network 130 may be any type of network that facilitates communications and data transfer between components of transaction system 100, such as, for example, financial service provider system 110 and merchant system 120. Network 130 may be a Local Area Network (LAN), a Wide Area Network (WAN), such as the Internet, and may be a single network or a combination of networks. Network 130 is not limited to the above examples and transaction system 100 may implement any type of network that allows the entities (shown and not shown) of transaction system 100 to exchange data and information.

Transaction system 100 may be configured to conduct a transaction associated with the use of a transaction card 140. In one example, financial service provider system 110 may provide transaction card 140 to a customer for use in conducting transactions associated with a financial service account held by the customer. In an example of one such transaction, the customer may use transaction card 140 at a merchant location to make a purchase. During the course of the purchase, information may be transferred from transaction card 140 to merchant system 120 (e.g., a point of sale device). Merchant system 120 may communicate with financial service provider system 110 via network 130 to complete the transaction. For example, merchant system 120 may receive account information from transaction card 140 by scanning a magnetic stripe on transaction card 140, receiving wireless data emitted by transaction card 140, or receiving data transmitted by a chip embedded in transaction card 140. Merchant system 120 may transmit the account information and a purchase amount, among other transaction information, to financial service provider system 110. Financial service provider system 110 may settle the transaction by transferring funds from the customer's financial service account to a financial service account associated with the merchant.

While transaction system 100 and transaction card 140 are depicted and described in relation to transactions that involve customers, merchants, and financial service providers, it should be understood that these entities are used only as an example to illustrate one environment in which transaction card 140 may be used. Moreover, it should be understood that transaction card 140 is not limited to financial products and may be any physical card product that is configured to provide information to another device. For example, transaction card 140 may be an identification card configured to provide information to a device in order to identify the holder of the card (e.g., driver's license) or provide information about the holder of the card (e.g., insurance card).

In an embodiment, transaction card 140 may include a card frame 142. In some embodiments, card frame 142 may include at least two separate components that, when secured to each other, form transaction card 140. For example, transaction card 140 may include two-piece construction that includes a first card component that forms a first surface of transaction card 140 and a second card component that forms a second surface of transaction card 140. Additional components may also be included.

In some embodiments, transaction card 140 may further include a transaction component 144. Transaction component 144 may include one or more transaction components, such as electronic devices, magnetic devices, electromagnetic devices, and/or other elements configured to receive, store, process, provide, transfer, transmit, conduct, send, delete, and/or generate information. For example, transaction component 144 may be a microchip (e.g., EMV chip), a communication device (e.g., NFC antenna, Bluetooth® device, WiFi device), a magnetic strip, a barcode, QR code, etc. Transaction component 144 may be secured to card frame 142 in such a way that allows card frame 142 to carry transaction component 144 while maintaining a utility of transaction component 144 (i.e., allowing transaction component 144 to interact with merchant system 120).

Figure 2A:
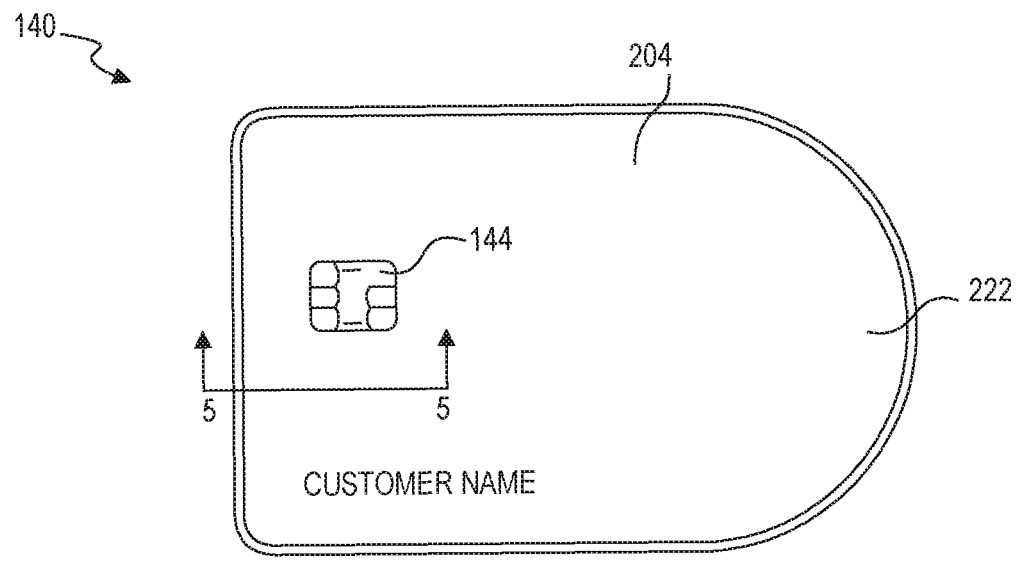
FIG. 2A is a top-view illustration of an embodiment of a transaction card, consistent with disclosed embodiments.
Figure 2B:
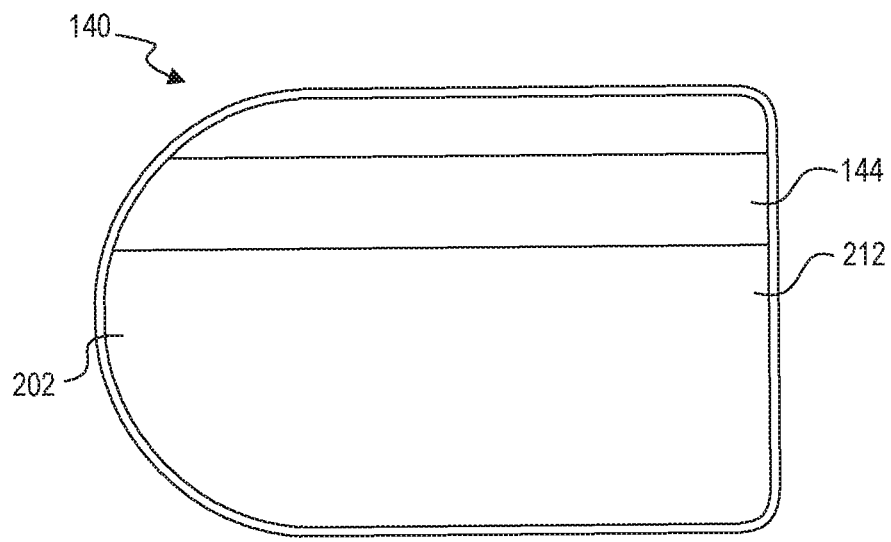
FIG. 2B is a bottom-view illustration of the transaction card of FIG. 3A.

FIGS. 2A and 2B illustrate an embodiment of transaction card 140. In the embodiment of FIGS. 2A-2B, transaction card 140 includes a two-piece construction. For example, transaction card 140 may include two separate, independently movable card components: a generally planar upper card component 204 (as shown in FIG. 2A) and a generally planar lower card component 202 (as shown in FIG. 2B). Upper and lower card components 204, 202 may be first and second card components, or vice versa.

In some embodiments, transaction card 140 may include a cavity/inlay construction in which lower card component 202 forms a cavity and upper card component 204 forms an inlay component configured to be seated within the cavity. It should be understood, however, that other configurations are possible. For example, transaction card 140 may include a "bucket-and-lid" construction in which lower card component 202 forms a container and upper card component 204 forms a lid that is configured to close the container and that rests on a rim of lower card component 202. Lower card component 202 and upper card component 204 may be securable to each other to at least partially enclose a space to hold transaction component 144.

Lower card component 202 and upper card component 204 may be permanently or temporarily secured to each other to form a complete card frame 142. For example, lower card component 202 may be secured to upper card component 204 using an adhesive, or by overmolding, pressure fit, interference fit, clasp, tongue-in-groove, post-and-hole, etc. If lower card component 202 and upper card component 204 are temporarily secured to each other, an attachment feature (e.g., for hinged attachment, sliding attachment, etc.) may be included to allow card frame 142 to be disassembled. Other techniques for securing lower card component 202 to upper card component 204 may be apparent to those of skill in the art.

FIG. 2A illustrates a top-view of transaction card 140 and FIG. 2B illustrates a bottom-view of transaction card 140. As shown in FIGS. 2A-2B, transaction card 140 may include generally planar first exterior surface 212 and generally planar second exterior surface 222. Exterior surfaces 212, 222 may be similar in size to that of conventional transaction cards. Lower card component 202 and upper card component 204 may be configured such that exterior surfaces 212, 222 have any desired shape, such as a shape selected for an ornamental or aesthetic design. It should be understood, however, that other shapes may be used.

Exterior surfaces 212, 222 may form a majority of the exposed surface area of transaction card 140. One or more of exterior surfaces 212, 222 may include additional features, such as identifying information (e.g., card number, customer name, customer signature, expiration date, security code, etc.), additional transaction components 144 (e.g., magnetic strips, bar codes, QR codes, etc.), visual features (e.g., colors, designs, pictures, logos, etc.), and the like.

Figure 3A:
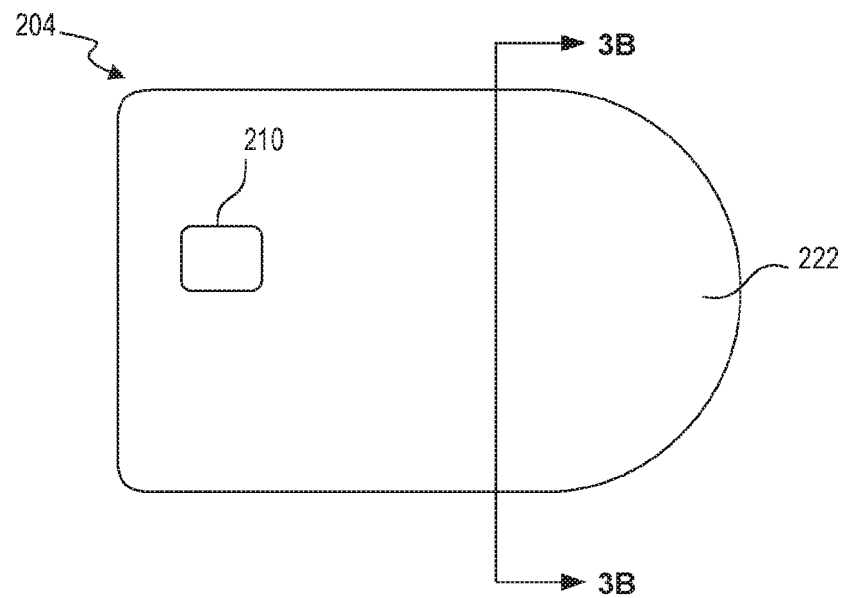
FIG. 3A is a top-view illustration of an embodiment of a card inlay, consistent with disclosed embodiments.

FIG. 3A shows a top view illustration of upper card component 204. Upper card component may include exterior surface 222 and have a window 210 to provide access to transaction component 144. Upper card component 204 may be formed by any suitable process, such as injection molding, compression molding, or another molding process. Alternatively, upper card component 204 may be cut from a sheet of card stock using any suitable cutting process (e.g., stamping, laser cutting, milling, etc.). Upper card component may be constructed out of various materials that provide additional advantages and customizability to transaction card 140. For example, upper card component 204 may be constructed of soft touch plastics, hammered-texture materials, bead-blasted metals (e.g., aluminum), wooden materials (e.g., cherry, pine, ebony, oak, bamboo, etc.), sapphire crystal materials (both pure and doped with titanium), natural fiber composite materials, leather, ceramic materials, slate, etc. In some embodiments, upper card component 204 may include additional material features, such as coverings (e.g., a silicone overmold), veneers (e.g., a wooden veneer), finishes (e.g. an oil-slick aluminum finish), or the like.

Figure 3B:
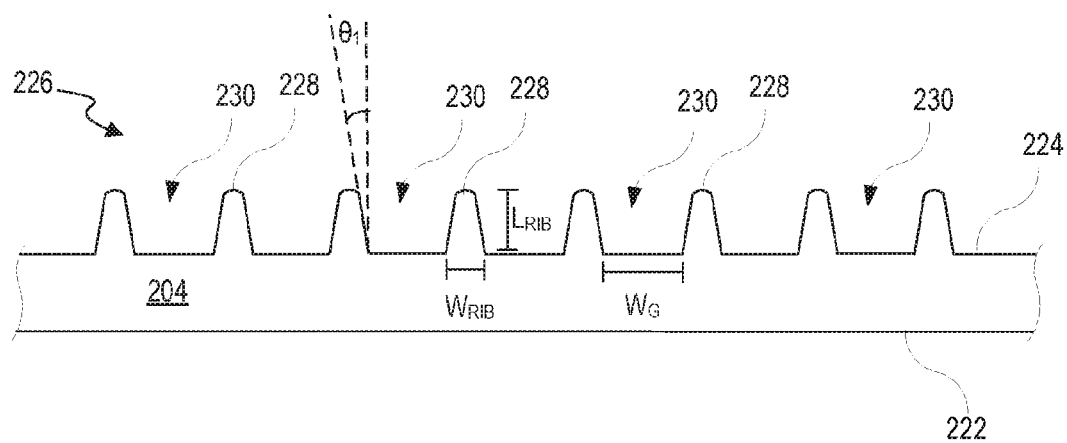
FIG. 3B is a cross-sectional illustration taken along line 3B-3B of FIG. 4A.

FIG. 3B illustrates a cross-sectional view of upper card component 204 taken along line 3B-3B of FIG. 3A. As shown, a first side of upper card component 204 may be defined by exterior surface 222. A second side of upper card component 204 may be defined by an interior surface 224 opposite exterior surface 222. To help enhance the structural integrity of upper card component 204 (and hence transaction card 140), upper card component may include a first structural feature 226 associated with interior surface 224. First structural feature 226 may be or include one or more structural elements that extend from, are connected to, or are otherwise associated with interior surface 224.

For example, first structural feature 226 may include a plurality of ribs 228 separated by gaps 230. Ribs 228 may be integral with upper card element 204 or may be added thereto as a separate component (e.g., by adhesion, material deposition, fastening, etc.). Ribs 228 may have any desired shape and may be dimensioned according to standard design guidelines or have customized dimensions. For example, in some embodiments, ribs 228 may have a desired length $L_{RIB}$ based on dimensional constrains of upper card component 204 and/or transaction card 140 (e.g., overall thickness of transaction card 140). Ribs 228 may also have a desired width $W_{RIB}$ that may be selected based on desired performance factors (e.g., rigidity, weight, etc.) and cost consideration. Ribs 228 may also have a draft angle $\theta_1$ greater than 0° to improve rigidity and reduce stress concentrations. For example, in some embodiments, the draft angle $\theta_1$ may be 0.5-3.5°. For example, the draft angle $\theta_1$ may be 1.5-3.0° or 2.0-2.5°. It should be understood that the draft angle $\theta_1$ may be greater than or less than 0.5-3.5°. In some embodiments, the draft angle $\theta_1$ may vary from rib to rib, for example, in order to provide a pattern for alignment during card assembly.

Gaps 230 may also be dimensioned according to standard design guidelines or have customized dimensions. For example, the width $W_G$ of each gap 230 may be set to a desired length based on desired performance factors (e.g., rigidity, weight, etc.) and cost considerations. Alternatively, the width $W_G$ of each gap 230 may be related to a dimension of ribs 228. For example, the width $W_G$ of each gap 230 may be a multiple of the width $W_{RIB}$ of each rib 228. In some embodiments, for example, the width $W_G$ of each gap 230 may be 1-5 times the width $W_{RIB}$ of each rib 228. In other embodiments, the width $W_G$ of each gap 230 may be 1.5-4.5 times, 2.0-4.0 times, 2.5-3.5 times, or 3 times the width $W_{RIB}$ of each rib 228. It should be understood that other multiples, ratios, or relationships between the width $W_G$ of gaps 230 and the width $W_{RIB}$ of ribs 228 may be used. In some embodiment, the width $W_G$ of gaps 230 can vary (e.g., in connection with any variance in ribs 228), for example, to provide a pattern for alignment during card assembly.

Figure 4A:
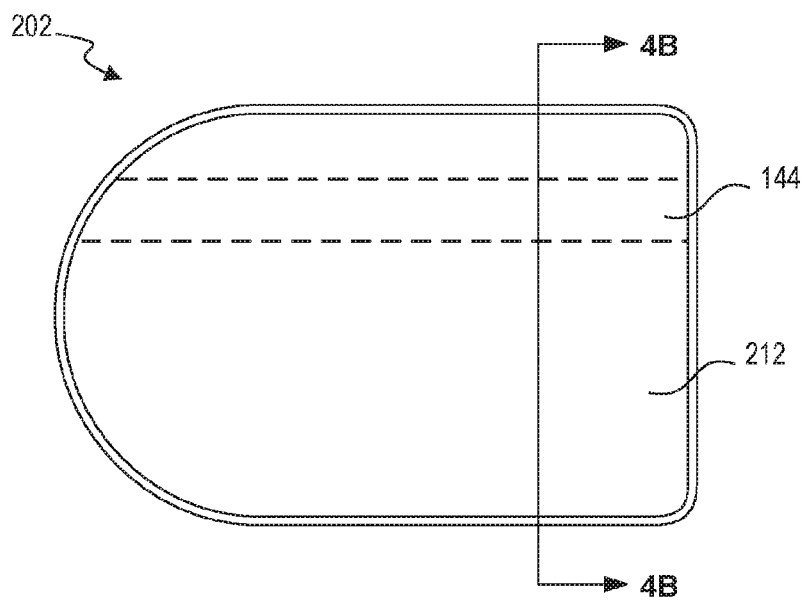
FIG. 4A is a top-view illustration of an embodiment of a card frame, consistent with disclosed embodiments.

FIG. 4A shows a top view illustration of lower card component 202. Lower card component may include exterior surface 212. Exterior surface 212 may be optionally configured to house transaction component 144 (e.g., a magnetic strip—shown in phantom lines). Lower card component 202 may be formed by any suitable process, such as injection molding, compression molding, or another molding process. Alternatively, lower card component 202 may be cut from a sheet of card stock using any suitable cutting process (e.g., stamping, laser cutting, milling, etc.). Lower card component 202 may be constructed out of various materials that provide additional advantages and customizability to transaction card 140. For example, lower card component 202 may be constructed of soft touch plastics, hammered-texture materials, bead-blasted metals (e.g., aluminum), wooden materials (e.g., cherry, pine, ebony, oak, bamboo, etc.), sapphire crystal materials (both pure and doped with titanium), natural fiber composite materials, leather, ceramic materials, slate, etc. In some embodiments, lower card component 202 may include additional material features, such as coverings (e.g., a silicone overmold), veneers (e.g., a wooden veneer), finishes (e.g. an oil-slick aluminum finish), or the like. In some embodiments, lower card component 202 may be made of the same material as upper card component 204. In other embodiments, upper and low card components 204, 202 may be made of different materials.

In some embodiments, upper and lower card components 204, 202 may be made of different materials to achieve desired mechanical performance characteristics. For example, in some embodiments, lower card component 202 may be formed of a resin composite while upper card 204 may be formed of a different material, such as a different resin composite, a metal, wood (e.g., one or more wood layers), woven fiber, or another type of material, which may have different mechanical properties than lower card component. That is, when upper card component is made of a different material than lower card component, the different material may have a different flexural modulus, Young's modulus, flexural strength, etc. In this way, transaction card 140 may achieve improved mechanical performance (e.g., may be stiffer, stronger, more durable, etc.) in comparison to the material of lower card component 202. The different material may also have a different density, which can influence the overall weight of transaction card 140.

Figure 4B:
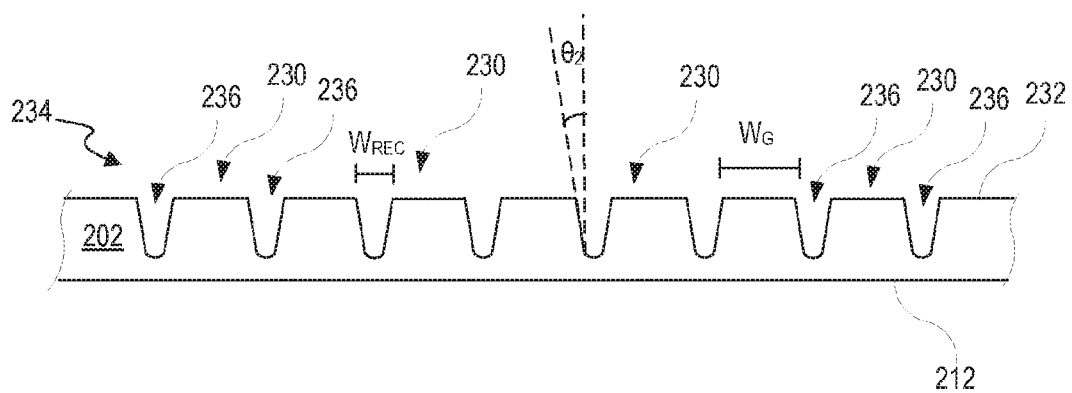
FIG. 4B is a cross-sectional illustration taken along line 4B-4B of FIG. 5A.

FIG. 4B illustrates a cross-sectional view of lower card component 202 taken along line 4B-4B of FIG. 4A. As shown, a first side of lower card component 202 may be defined by exterior surface 212. A second side of lower card component 202 may be defined by an interior surface 232 opposite exterior surface 212. To help enhance the structural integrity of lower card component 202 (and hence transaction card 140), lower card component 202 may include a second structural feature 234 associated with interior surface 232. Second structural feature 234 may be or include one or more structural elements that extend from, are connected to, or are otherwise associated with interior surface 232.

For example, second structural feature 234 may include a plurality of recesses 236 separated by gaps 230. Recesses 236 may be integral with lower card element 202 or may be added thereto as a separate component (e.g., by adhesion, material deposition, fastening, etc.). Recesses 236 may have any desired shape and may be dimensioned according to standard design guidelines or have customized dimensions. In some embodiments, recesses 236 may be dimensioned to match the dimensions of ribs 228, depicted in FIG. 3B. For example, recesses 236 may have a width $W_{REC}$ that that is equal to the width $W_{RIB}$ of ribs 228. In other embodiments, the width $W_{REC}$ of recesses 236 may be less than the width $W_{RIB}$ of ribs 228 (e.g., to provide an interference fit or "snap fit" for connecting upper and lower card components 204, 202) or greater than the width $W_{RIB}$ of ribs 228 (e.g., to provide a looser fitting connection). In some embodiments, $W_{REC}$ and $W_{RIB}$ may vary (i.e., in coordination with each other), for example, to provide a pattern for alignment during card assembly.

Recesses 236 may also have a draft angle $\theta_2$ greater than 0° to improve rigidity and reduce stress concentrations. For example, in some embodiments, the draft angle $\theta_2$ may be 0.5-3.5°. For example, the draft angle $\theta_2$ may be 1.5-3.0° or 2.0-2.5°. It should be understood that the draft angle $\theta_2$ may be greater than or less than 0.5-3.5°. In some embodiments, the draft angle $\theta_2$ of recesses 236 may be equal to the draft angle $\theta_1$ of ribs 228. In other embodiments, the draft angle $\theta_2$ of recesses 236 may be less than the draft angle $\theta_1$ of ribs 228 (e.g., to provide an interference fit or "snap fit" for connecting upper and lower card components 204, 202) or greater than the draft angle $\theta_1$ of ribs 228 (e.g., to provide a looser fitting connection). In some embodiments, the draft angle $\theta_2$ may vary from recess to recess (e.g., in coordination with draft angle $\theta_1$), for example, in order to provide a pattern for alignment during card assembly.

Figure 5A:
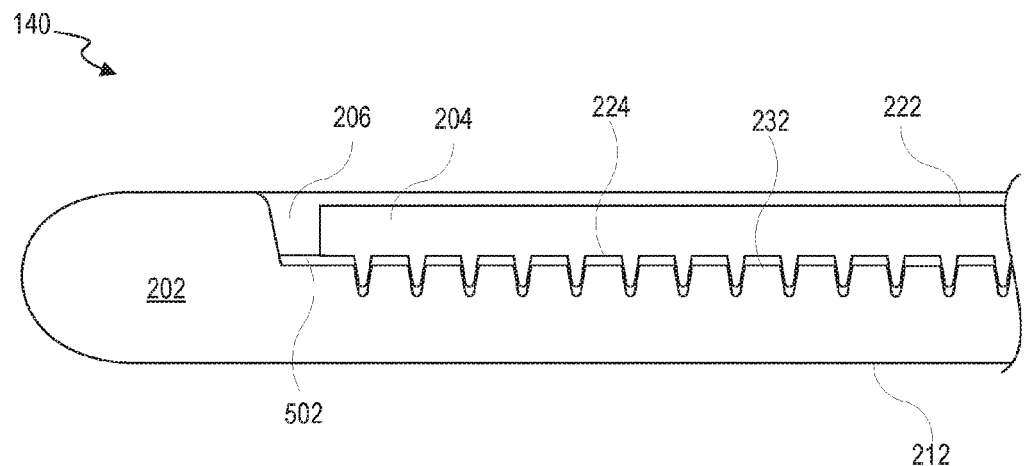
FIG. 5A is a cross-sectional illustration taken along line 5-5 of FIG. 3A, consistent with disclosed embodiments.

FIG. 5A illustrates a cross-sectional view of assembled transaction card 140, taken along line 5-5 of FIG. 2A. As shown, upper card component 204 may be positioned in a space 206 defined within lower card component 202. An adhesive layer 502 may be placed between interior surfaces 224 and 232 (i.e., first and second interior surfaces or vice versa) to adhere upper card component 204 to lower card component 202. In this way, upper card component 204 may be secured to lower card component 202. Adhesive layer 502 may include any suitable adhesive material, such as a hot melt adhesive, pressure-sensitive adhesive, etc. It should be understood, however, that other means of attaching upper card component 204 to lower card component 202 may be used. For example, in some embodiments, upper card component 204 may be insert molded into lower card component 202. Specifically, upper card component may be placed into an injection mold and lower card component 202 may be injection molded around upper card component 204.

Figure 5B:
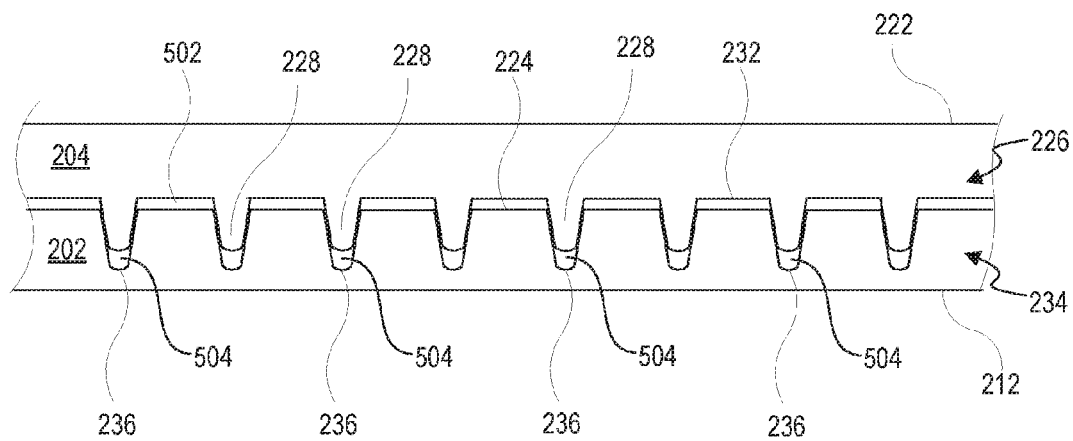
FIG. 5B is a zoomed-in view of FIG. 5A.

FIG. 5B is a zoomed-in view of the cross-sectional view of FIG. 5A. As shown, first structural feature 226 and second structural feature 234 may be configured to interconnect. As used herein with regard to structural features 226 and 234, being configured to "interconnect" may refer to being configured to connect with one another, to be mutually connected (or mutually connectable), or to have (or be configured to have) internal connections between parts. For example, first structural feature 226 and second structural feature 234 may be configured to interconnect in that they may be configured to engage with each other by overlapping or by fitting together as projections (e.g., ribs 228) and recesses (e.g., recesses 236). First structural feature 226 and second structural feature 234 may also or alternatively be configured to interconnect by fastening together when engaged. For example, first structural feature 226 and second structural feature 234 may be configured to interconnect by a snap fit mechanism (e.g., a button-type mechanism), an interference fit (i.e., frictional fit), a sliding fit (e.g. dovetails), etc.

In some embodiments, first structural feature 226 and second structural feature 234 may be configured to interconnect by a tongue and groove connection. For example, as shown in FIG. 5B, ribs 228 may be tongues and recesses 236 may be grooves. In some embodiments, tongues and grooves (e.g., ribs 228 and recesses 236) may include additional interconnecting or mating features, such as guide rails and slots, shaped edges or corners, complimentary shapes, etc. In some embodiments, first structural feature 226 and second structural feature 234 may form an interconnecting pattern, such as a lattice pattern. It should be understood that various types and patterns of interconnecting geometry may be used to form first structural feature 226 and second structural feature 234 for purposes of providing an interconnecting or engaging connection.

In some embodiments, as shown in FIG. 5B, an adhesive gap 504 may be disposed between first and second structural features 226, 234. Adhesive gap 504 may be created by shortening ribs 228, lengthening (i.e., deepening) recesses 236, and/or by applying adhesive layer 502 between interior surfaces 224 and 232, thereby separating them. Adhesive gap 504 may be configured to hold adhesive from adhesive layer 502 or another adhesive. In this way, additional adhesion strength may be provided between upper and low card components 204, 202.

Figure 5C:
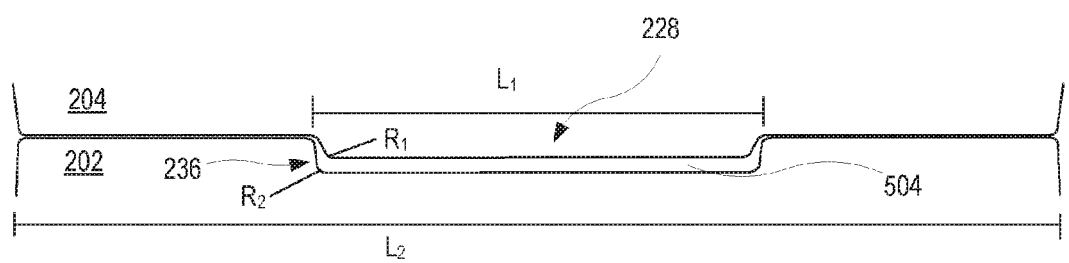
FIG. 5C is a zoomed-in view of an exemplary tongue and groove section, consistent with disclosed embodiments.

FIG. 5C, shows a zoomed in view of an exemplary tongue and groove section 235 consistent with disclosed embodiments. As shown, upper card component 204 may have a tongue 228 and lower card component 202 may have a groove 236, but it is understood that the tongue and groove can be associated with either of upper and lower component

204, 202. Tongue 228 and grove 236 may have a length $L_1$, and the tongue and groove section 235 may have a length $L_2$. Varying $L_1$ and $L_2$ may affect the number of tongue and groove connections that can be formed over a given dimension (e.g., area or length) of card 140. In this way, connection strength can be balanced with manufacturing factors (e.g., manufacturing time, tool precision, etc.) to achieve desired card performance within allowable manufacturing costs.

Tongue 228 and grove 236 may also be formed with fillet radii $R_1$ and $R_2$, respectively. Fillet radii $R_1$ and $R_2$ may be selected to achieve desired strength and durability of tongue 228 and groove 236. For example, greater radii may impart greater strength and durability upon tongue 228 and groove 236, which may also increase material usage. When upper and lower card components 204 and 202 are injection molded (i.e., formed via injection molding of plastic material), minimum radii values may be selected to ensure the injection molding process can be successfully achieved with the desired dimensions of tongue 228 and groove 236.

Dimensions of adhesive gap 504 may also be selected to vary connection strength with material usage and associated costs. For example, increasing the size of adhesive gap 504 may allow for greater amounts of adhesive to be used for joining upper and lower card components 204, 202, which can result in a stronger connection. Increasing the size of adhesive material used can increase manufacturing costs, but may be effective to insure the integrity of the connection. Reducing the size of adhesive gap 504 may save manufacturing costs (i.e., by reducing the amount of material used), thereby relying more on the integrity and design of tongue 228 and groove 236. In this way, features of tongue 228 and groove 236 may varied to achieve desired connection strength and manufacturing costs.

In some embodiments, with reference to in FIGS. 6A and 6B, transaction card 140 may include a first bracing layer 602 between upper card component 204 and lower card component 202 (e.g., first and second card components or vice versa). In some embodiments, first bracing layer 602 may be affixed (e.g., by adhesion, material deposition, fastening, interconnecting, etc.) to one of interior surfaces 224 and 232. In the example of FIG. 6A, first bracing layer 602 is affixed to interior surface 224 of upper card component 204. It should be understood that first bracing layer 602 may alternatively be affixed to interior surface 232 of lower card component 202. In the example of FIG. 6A, first bracing layer 602 is a single bracing layer. That is, in some embodiments, transaction card 140 may have only one bracing layer between upper and lower card components 204, 202.

In some embodiments, one of the first structural feature 226 and second support features 234 is disposed on first bracing layer 602. That is, one of the first structural feature 226 and second support features 234 may be integral with, built into, affixed to, or otherwise be a part of the first bracing layer 602. In the example of FIG. 6A, first structural feature 226 is disposed on first bracing layer.

First bracing layer 602 may be formed of any suitable material by any suitable manufacturing process. For example, processes such as milling, grinding, sanding, hammering, injection molding, compression molding, and the like, may be used to construct first bracing layer 602. First bracing layer may be formed from such materials as resins, plastics, metals, or other materials that may be suitable for forming a thin material. First structural feature may be constructed on or in first bracing layer during the forming process of bracing layer 602 and/or by a milling process, such as later cutting, stamping, milling, etc.).

First bracing layer 602 may be produced in sheets (e.g., as bracing stock) or in units prepared for application to individual transaction cards 140. In this way, the manufacturing process may be streamlined by eliminating the need to form structural features into every upper and/or lower card component 204, 202. That is, by preparing bracing layer 602 in a separate process, that process may be optimized for imparting the intricate details of ribs 228 or recesses 236 onto bracing layer 602, which may then be affixed to upper card component 204 or lower card component 202 in a simply and quicker process (e.g., by adhesion).

In some embodiments, as shown in FIG. 6B transaction card 140 may include a second bracing layer 604 affixed to the other of surfaces 224 and 232. That is, second bracing layer 604 may be affixed to whichever of surfaces 224 and 232 to which the first bracing layer 602 is not affixed. Similarly, the other of the first and second structural features 226 and 234 may be disposed on the second bracing layer 604. Second bracing layer 604 may be formed in a similar fashion as first bracing layer 602 to achieve similar advantages in streamlining the manufacturing process while improving the structural integrity of transaction card 140.

In other embodiments, with reference to FIGS. 7A-7D, transaction card 140 may include a single bracing layer 702 having a first side 704 opposite a second side 706. Each of the first and second sides 704, 706 of bracing layer 702 may include one of structural features 226 and 234 that may be configured to interconnect with the other of structural features 226 and 234 that is associated with a respective one of surfaces 224 and 232. For example, with reference to FIG. 7A, bracing layer 702 may include ribs 228 on first and second sides 704, 706. The ribs 228 on first and second sides 704, 706 may be configured to interconnect with recesses 236 on either of surfaces 224 and 232. In this way, an efficient manufacturing process may be established by which upper and lower card components are each provided with the same type of structural feature 226, 234. Similarly, bracing layer 702 may be provided with the other of structural features 226, 234 on each of sides 704 and 706. Advantageously, upper and lower card components 204, 202 may therefore be formed of any desired material (which may be the same or different materials), which can then be joined using bracing layer 702. That is, regardless of what type of material upper and lower card components 204, 202 are made of, a single bracing layer 702 design may be used to connect upper and lower card components 204, 202, thereby simplifying the manufacturing process and encouraging more refined development of structural features 226, 234 (e.g., due to less required variability in design).

Figure 7A:
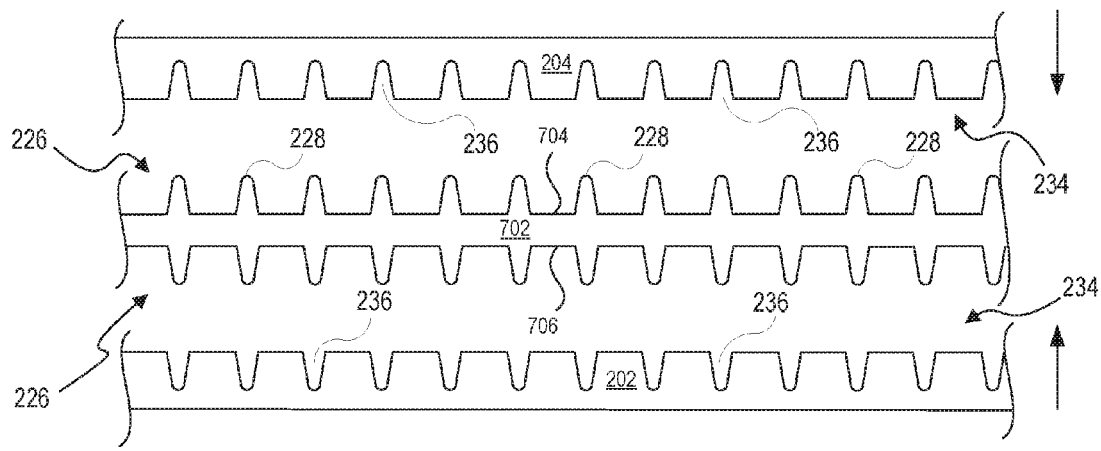
FIG. 7A is a zoomed-in cross-sectional view of an exemplary transaction card having a bracing layer.
Figure 7B:
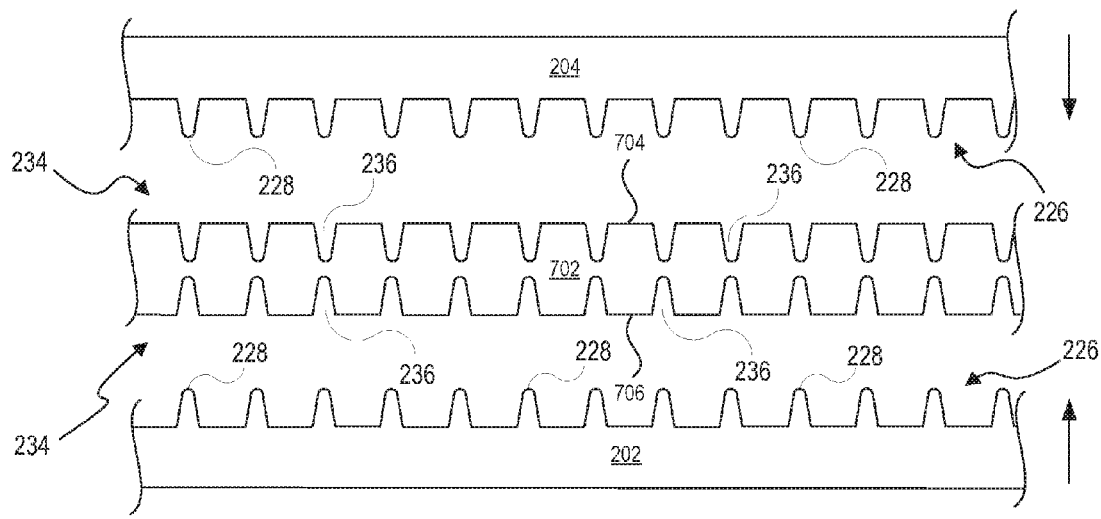
FIG. 7B is another zoomed-in cross-sectional view of an exemplary transaction card having a bracing layer.
Figure 7C:
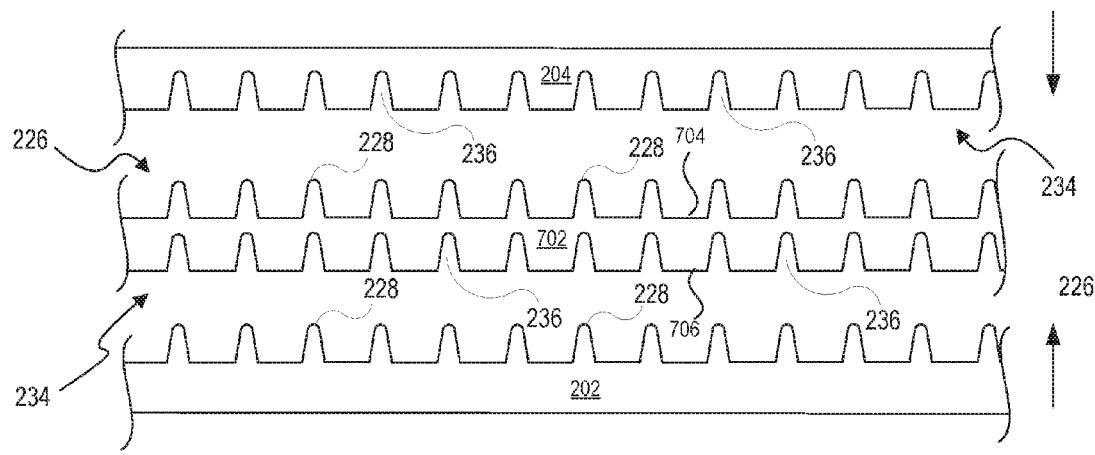
FIG. 7C is another zoomed-in cross-sectional view of an exemplary transaction card having a bracing layer.
Figure 7D:
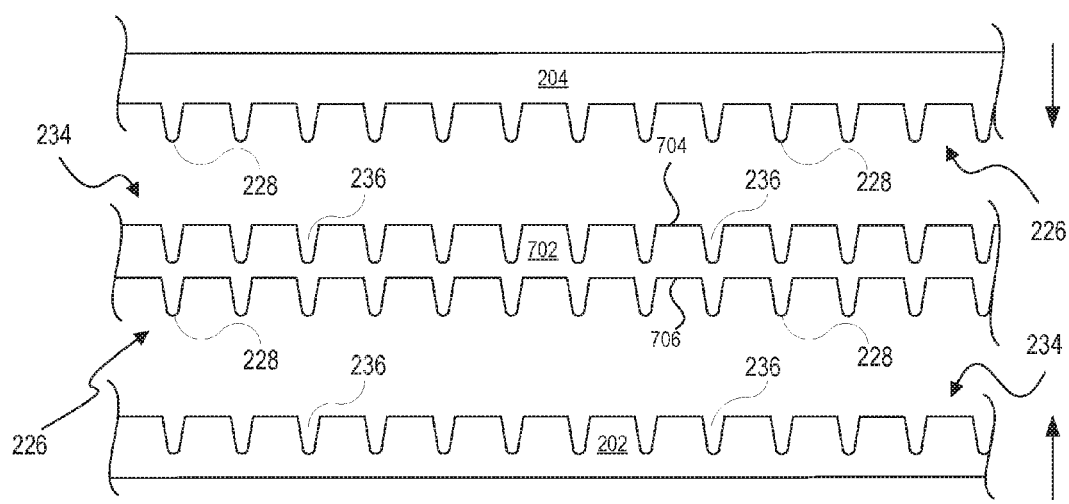
FIG. 7D is a zoomed-in cross-sectional view of an exemplary transaction card having a bracing layer.

As discussed above, bracing layer 702 may include the same type of structural feature on each of sides 704 and 706. In the example of FIG. 7A, first and second sides 704, 706 of bracing layer 702 may both include ribs 228. In other embodiments, as shown in the example of FIG. 7B, both sides 704, 706 of bracing layer 702 may include recesses configured to interconnect with ribs 228 associated with each of upper and lower card components 204, 202.

In other embodiments, first and second sides 704 and 706 of bracing layer 702 may include different types of structural features. For example, with reference to FIG. 7C, first side 704 of bracing layer 702 may include first structural features 226 (e.g., ribs 228). The first structural features 226 on the first side 704 of bracing layer 702 may be configured to interconnect with second structural features 234 (e.g., recesses 236) of upper card component 204. Second side 706 of bracing layer 702 may include second structural features 234 (e.g., recesses 236). The second structural features 234 of the second side 706 of bracing layer 702 may be configured to interconnect with first structural features 226 of lower card component 202.

Other pairings of structural features between first and second sides 704, 706 of bracing layer 702 and upper and lower card components 204, 202 may be implemented. For example, with reference to FIG. 7D, first side 704 of bracing layer 702 may include second structural features 234 (e.g., recesses 236). The second structural features 234 on the first side 704 of bracing layer 702 may be configured to interconnect with first structural features 226 (e.g., ribs) of upper card component 204. Second side 706 of bracing layer 702 may include first structural features 226 (e.g., ribs 228). The first structural features 226 of the second side 706 of bracing layer 702 may be configured to interconnect with second structural features 234 (e.g., recesses) of lower card component 204.

Figure 8:
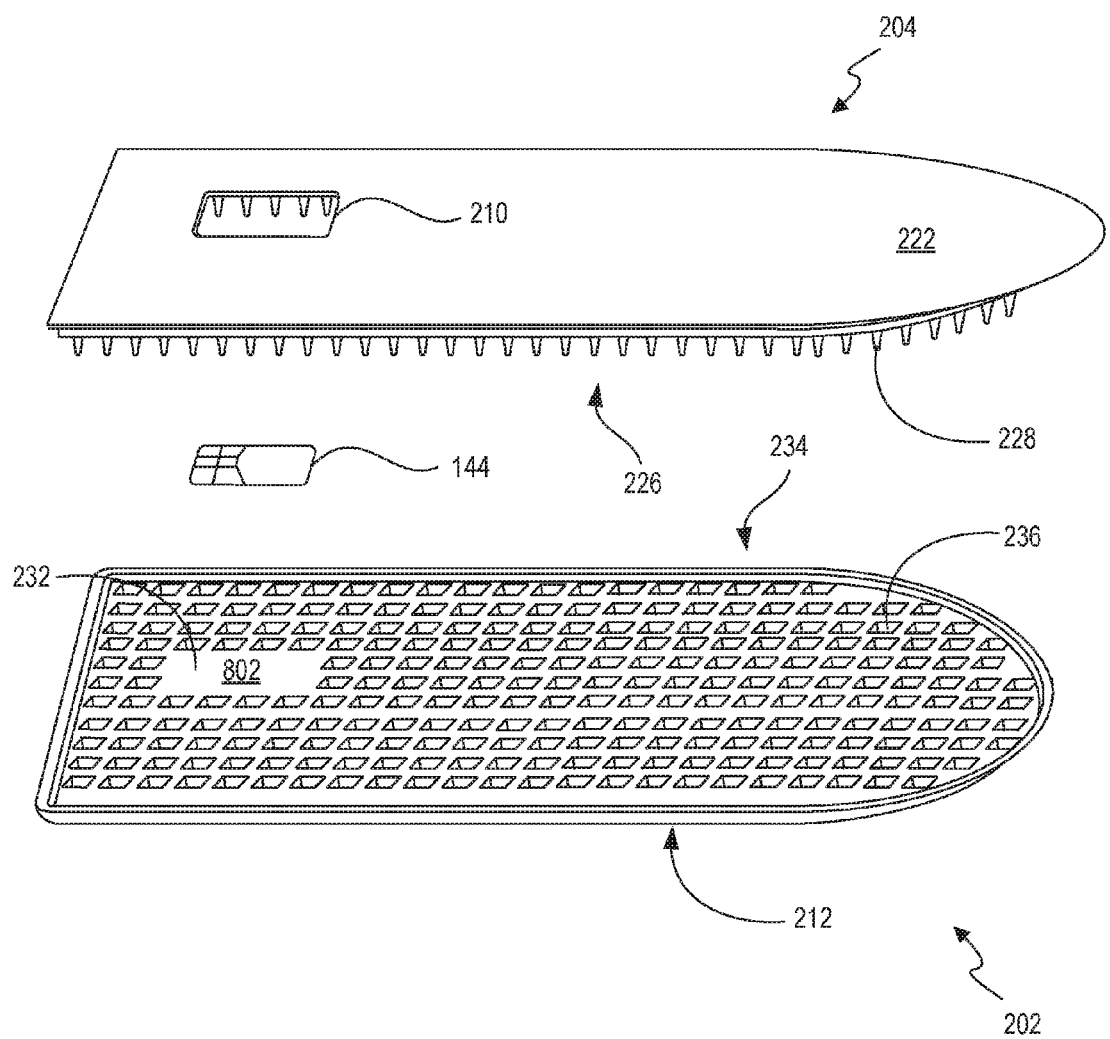
FIG. 8 is an exploded isometric view of an exemplary disclosed transaction card.

With reference to FIG. 8, upper card component 204 and lower card component 202 may be configured to accommodate transaction device 144 and assembled to form transaction card 140. For example, lower card component 202 may include a locating feature 802 configured to accommodate (e.g., house, affix, receive, etc.) transaction component 144. In the example of FIG. 8, locating feature 802 may be a flat space for securing a transaction component 144, such as an EMV chip. In other embodiments, locating feature 802 may be raised or lowered with respect to interior surface 232. Lower card component 202 may also or alternatively be configured to accommodate different and/or multiple types of transaction components 144. For example, lower card component 202 may also or alternatively include another locating feature (not shown) configured to accommodate an NFC wire, a magnetic stripe, or another type of transaction device. Such a locating feature may be disposed on interior surface 232 or raised or recessed with respect thereto.

Figure 9:
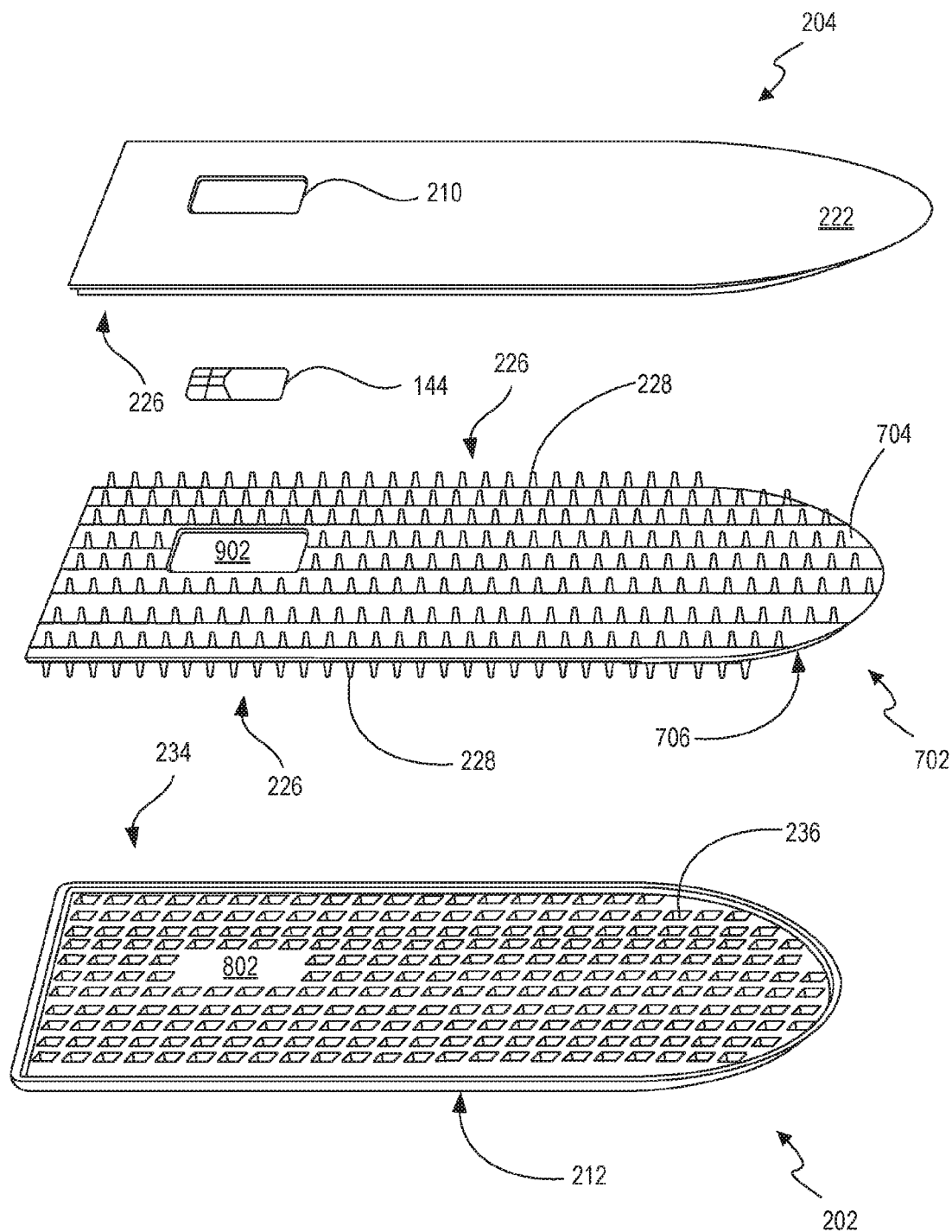
FIG. 9 is an exploded isometric view of an exemplary disclosed transaction card having a bracing layer.

In embodiments having bracing layer 702, as shown in FIG. 9, upper card component 204 and lower card component 202 may each be configured to separately interconnect to one side of bracing layer 702. Bracing layer 702 may be formed of a different material than upper and lower card components 204, 202 in order to improve the overall mechanical properties (e.g., stiffness, strength, etc.). That is, in some embodiments, each of upper card component 204, bracing layer 702, and lower card component 202 may be formed of a different material, and bracing layer 702 have a greater stiffness or rigidity than upper and lower card components 204, 202.

Bracing layer 702 may also have a locating feature 902 configured to accommodate transaction device 144. In some embodiments, locating feature 902 may be a window configured to allow transaction device 144 to be contacted through upper card component 204 and bracing layer 702 (i.e., transaction device 144 may be mounted to lower card component 202). In other embodiments, locating feature 902 may comprise a recessed portion with a lower surface configured to receive transaction component 144. That is, locating feature 902 may be configured to be affixed to transaction device 144, for example, using an adhesive. Locating feature 902 of bracing layer 702 may be aligned with window 210 and locating feature 802 of lower card component 202. In the example of FIG. 9, locating feature 902 may be configured to accommodate a transaction component 144, such as an EMV chip. Bracing layer 702 may also or alternatively be configured to accommodate different and/or multiple types of transaction components 144. For example, bracing layer 702 may also or alternatively include another locating feature (not shown) configured to accommodate an NFC wire, a magnetic stripe, or another type of transaction device.

While illustrative embodiments have been described herein, the scope includes any and all embodiments having equivalent elements, modifications, omissions, combinations (e.g., of aspects across various embodiments), adaptations or alterations based on the present disclosure. For example, in some embodiments, no bracing layers may be used (i.e., structural features 226, 234 may be integral with upper and lower card components 204, 202), one bracing layer may be used (e.g., either first bracing layer 602 or second bracing layer 604), or two bracing layers may be used (e.g., first and second bracing layers 602, 604). Also, different materials may be used for each component of transaction card 140, or each component may be me made of the same or similar materials.

Figure 10:
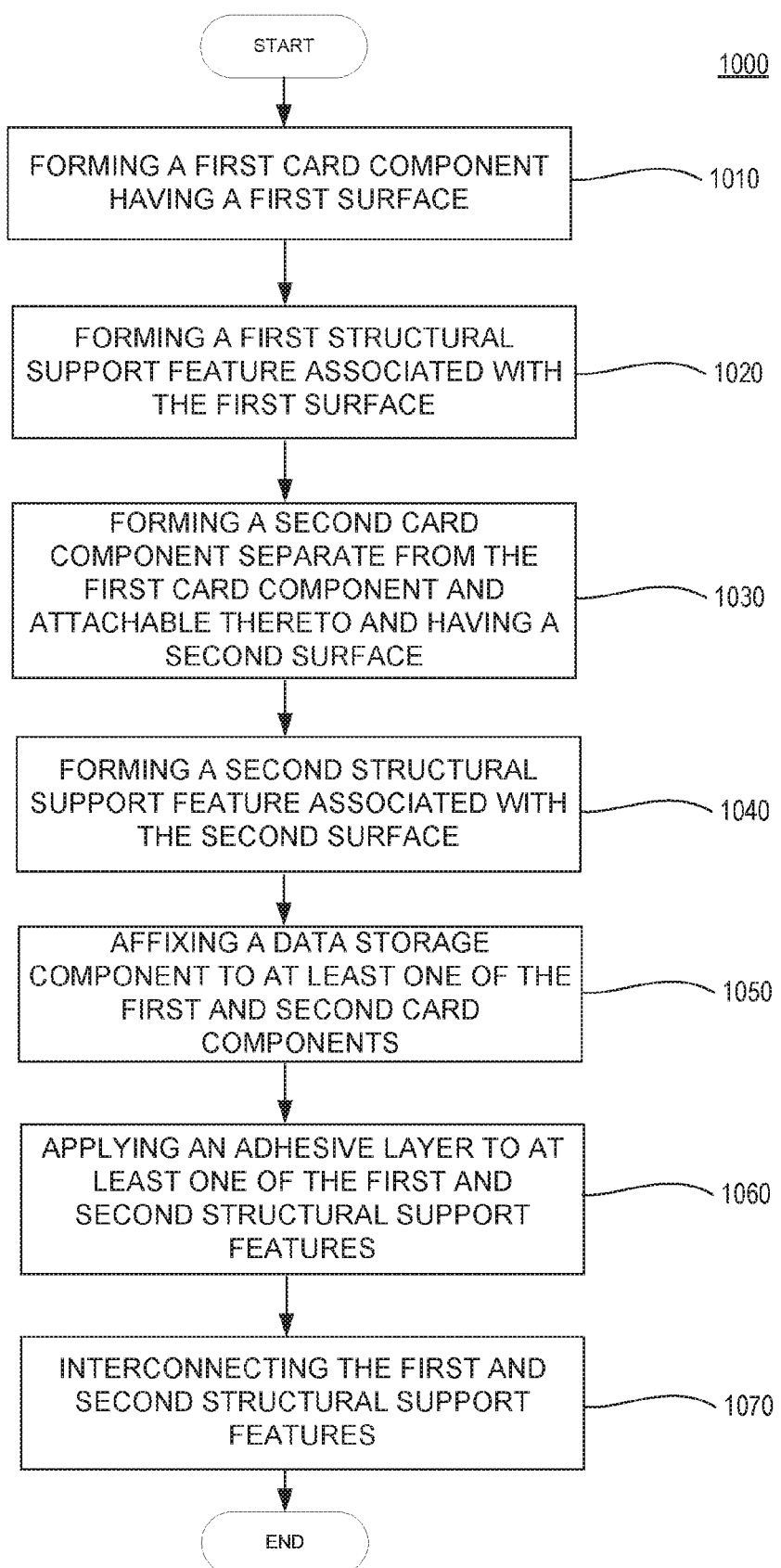
FIG. 10 is a flowchart showing an exemplary method for forming a transaction card, consistent with the disclosed embodiments.

FIG. 10 is a flowchart showing an exemplary method 1000 for forming a transaction card. Method 1000 may include forming a first card component (e.g., upper card component 204 or lower card component 202) having a first surface (e.g., interior surface 224 or interior surface 232) (Step 1010). For example upper or lower card component 204, 202 may be constructed using one of the manufacturing processes described above (e.g., a molding process, a milling process, etc.). Method 1000 may also include forming a first structural feature (e.g., first structural feature 226 or second structural feature 234) associated with the first surface (Step 1020). For example, first or second structural feature 226, 234 may be formed during the construction of upper or lower card component 204, 202, respectively. Alternatively, first or second structural feature 226, 234 may be formed during a subsequent manufacturing step, such as a milling process, a material deposition process, a laser cutting process, etc., after the formation of upper or lower card component 204, 202. In some embodiments, step 1020 may include forming structural features 226 and 234 on bracing layers 602 and 604, which may then be affixed to interior surface 224 or 232. As discussed above, bracing layers 602 and 604 may be constructed using a suitable molding, milling, or other type of manufacturing process.

Method 1000 may further include forming a second card component (e.g., the other of upper and lower card components 204, 202) separate from the first card component and attachable thereto and having a second surface (e.g., the other of interior surface 224 or interior surface 232) (Step 1030). It should be noted that method 1000 may include forming upper card component 204 and lower card component 202 (as well as their respective surfaces and/or structural features) in either order. The second card component may be formed by the same or a different manufacturing process as the first card component, as discussed above.

Method 1000 may further include forming a second structural feature (e.g., the other of first or second structural feature 226, 234) associated with the second surface (Step 1040). For example, as described above, first or second structural feature 226, 234 may be formed during the construction of upper or lower card component 204, 202, respectively. Alternatively, first or second structural feature 226, 234 may be formed during a subsequent manufacturing step, such as a milling process, a material deposition process, a laser cutting process, etc., after the formation of upper or lower card component 204, 202. In some embodiments, step 1040 may include forming the second structural feature on a second bracing layer (e.g., the other of bracing layers 602 and 604), which may then be affixed to interior surface 224 or 232. The second bracing layer may be constructed using the same or a different manufacturing process as the first bracing layer.

During steps 1020 and 1040, first and second structural features 226 and 234 may be configured to interconnect. That is, during steps 1020 and 1040, first and second structural features 226 and 234 may be provided with complimentary features or structural components that allow them to interconnect, as discussed above. For example, one of first and second structural features 226 and 234 may be formed to include protrusions (e.g., ribs 228), and the other of first and second structural features 226 and 234 may be formed to include recesses (e.g., recesses 236) configured to receive the protrusions. In some embodiments, first and second structural features 226 and 234 may be configured to interconnect by a tongue and groove connection. For example, ribs 228 may be tongues, and recesses 236 may be grooves configured to receive ribs 228.

Method 1000 may further include affixing a transaction component (e.g., transaction component 144) to at least one of the first and second card components (Step 1050). For example, step 1050 may include affixing (e.g., by an adhesive) a microchip (e.g., an EMV chip) to one of or between upper and lower card components 204 and 202. A magnetic strip may also or alternatively be affixed (e.g., by lamination) to one side of upper card component 204 or lower card component 202. Other or additional types of transaction components may be used.

Method 1000 may further include applying an adhesive layer to at least one of the first and second structural features 226 and 234 (Step 1060). For example, prior to assembling (e.g., joining) the first and second card components, an adhesive layer (e.g., adhesive layer 502) may be applied to either or both interior surfaces 224 and 232. That is, when structural features 226 and 234 are formed directly on interior surfaces 224 and 232, the adhesive layer applied to surfaces 224 and 232 may be applied to (or allowed to spill into or onto) structural features 226 and 234. In embodiments where structural features 226 and 234 are formed on bracing layers 602 and 604, adhesive may be applied, for example, over ribs 228 and/or recesses 236.

Method 1000 may further include interconnecting the first and second structural features (Step 1070). That is, step 1070 may include pressing together upper and lower card components 204 and 202, thereby causing first and second structural features 226 and 234 to be pressed together and interconnected (e.g., via ribs 228 and recesses 236). In some embodiments, ribs 228 and recesses 236 may be formed such that a gap (e.g., adhesive gap 504) or space exists between the first and second structural features 226 and 234. In this way, adhesive applied during step 1060 may be provided with a space to collect and reside during step 1060.

The elements in the following claims are to be interpreted broadly based on the language employed in the claims and not limited to examples described in the present specification or during the prosecution of the application, which examples are to be construed as non-exclusive. It is intended, therefore, that the specification and examples be considered as example only, with a true scope and spirit being indicated by the following claims and their full scope of equivalents.

What is claimed is:

1. A transaction card, comprising:
    a first card component, including:
        a first interior surface;
        a first exterior surface opposite the first interior surface; and
        a first structural feature associated with the first interior surface;
    a second card component separate from the first card component and attachable thereto, wherein the second card component includes:
        a second interior surface;
        a second exterior surface opposite the second interior surface; and
        a second structural feature associated with the second interior surface;
    a transaction component; and
    a first bracing layer between the first and second card components, wherein:
        one of the first and second card components includes a locating feature configured to accommodate the transaction component, and the other of the first and second card components is configured to provide access to the transaction component;
        the first and second structural features are configured to interconnect;
        the first bracing layer is affixed to one of the first and second interior surfaces;
        one of the first and second structural features is disposed on the first bracing layer; and
        the first bracing layer includes a locating feature configured to further accommodate the transaction component.

2. The transaction card of claim 1, wherein the first structural feature comprises a plurality of ribs separated by gaps.

3. The transaction card of claim 2, wherein the ribs are integral with the first card component.

4. The transaction card of claim 2, wherein the ribs are attached to the first card component by adhesion, material deposition, or fasteners.

5. The transaction card of claim 2, wherein the ribs have a draft angle greater than zero degrees.

6. The transaction card of claim 5, wherein the draft angle is between 0.5 degrees and 3.5 degrees.

7. The transaction card of claim 2, wherein a width of the gaps is 1-5 times a width of the ribs.

8. The transaction card of claim 2, wherein the second structural feature comprises a plurality of recesses separated by gaps.

9. The transaction card of claim 8, wherein the recesses have a draft angle greater than zero.

10. The transaction card of claim 9, wherein the draft angle is between 0.5 degrees and 3.5 degrees.

11. The transaction card of claim 1, wherein the first and second structural features are configured to form a snap fit, an interference fit, or a sliding fit connection.

12. The transaction card of claim 1, wherein the first and second structural features are configured to interconnect via a tongue and groove connection.

13. The transaction card of claim 1, wherein the first and second structural features are configured to interconnect via a lattice pattern.

14. The transaction card of claim 1, further comprising a second bracing layer between the first and second card components, wherein:
    the second bracing layer is affixed to other of the first and second interior surfaces that is not affixed to the first bracing layer;
    the other of the first and second structural features not disposed on the first bracing layer is disposed on the second bracing layer; and the second bracing layer includes a locating feature configured to further accommodate the transaction component.

15. A transaction card, comprising:
a first card component, including:
   a first interior surface;
   a first exterior surface opposite the first interior surface; and
   a first structural feature associated with the first interior surface;
a second card component separate from the first card component and attachable thereto, wherein the second card component includes:
   a second interior surface;
   a second exterior surface opposite the second interior surface; and
   a second structural feature associated with the second interior surface;
a transaction component;
a single bracing layer having a first side opposite a second side; wherein:
   one of the first and second card components includes a locating feature configured to accommodate the transaction component, and the other of the first and second card components is configured to provide access to the transaction component;
   wherein the first and second structural features are configured to interconnect;
   each of the first and second sides of the bracing layer comprises one of the first and second structural features; and
   each of the first and second interior surfaces are configured to interconnect with the bracing layer.

16. The transaction card of claim 15, wherein the first and second sides of the bracing layer include the same type of structural feature.

17. The transaction card of claim 16, wherein the first and second interior surfaces include a structural feature configured to interconnect with the first and second structural features of the bracing layer.

18. The transaction card of claim 15, wherein the first and second sides of the bracing layer include different types of structural features.

19. The transaction card of claim 18, wherein:
the first interior surface includes a structural feature configured to interconnect with one of the first and second structural features of the bracing layer; and
the second interior surface includes a structural feature configured to interconnect with the other of the first and second structural features of the bracing layer.

* * * * *